(12) United States Patent
Fujiki et al.

(10) Patent No.: US 10,141,566 B2
(45) Date of Patent: Nov. 27, 2018

(54) LITHIUM SECONDARY BATTERY INCLUDING A COATED CATHODE MATERIAL AND SOLID ELECTROLYTE, AND METHOD OF PREPARING THE SAME

(71) Applicant: Samsung Electronics Co., Ltd., Suwon-si, Gyeonggi-do (KR)

(72) Inventors: Satoshi Fujiki, Yokohama (JP); Yuichi Aihara, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 119 days.

(21) Appl. No.: 14/818,736

(22) Filed: Aug. 5, 2015

(65) Prior Publication Data

US 2016/0049646 A1 Feb. 18, 2016

(30) Foreign Application Priority Data

Aug. 15, 2014 (JP) ................................. 2014-165428
Mar. 23, 2015 (KR) ........................ 10-2015-0040214

(51) Int. Cl.
*H01M 4/36* (2006.01)
*H01M 4/525* (2010.01)
(Continued)

(52) U.S. Cl.
CPC ......... *H01M 4/366* (2013.01); *H01M 4/0404* (2013.01); *H01M 4/0471* (2013.01); *H01M 4/1391* (2013.01); *H01M 4/364* (2013.01); *H01M 4/38* (2013.01); *H01M 4/505* (2013.01); *H01M 4/525* (2013.01); *H01M 4/62* (2013.01);
(Continued)

(58) Field of Classification Search
CPC combination set(s) only.
See application file for complete search history.

(56) References Cited

U.S. PATENT DOCUMENTS

2008/0311432 A1* 12/2008 Park .................... H01B 1/08
429/5
2010/0112449 A1* 5/2010 Fujita .................. H01M 4/13
429/231
(Continued)

FOREIGN PATENT DOCUMENTS

EP 1309022 A3 5/2003
JP 1998-59725 A 3/1998
(Continued)

*Primary Examiner* — Imran Akram
(74) *Attorney, Agent, or Firm* — Cantor Colburn LLP

(57) ABSTRACT

A lithium secondary battery wherein the cathode layer comprises a cathode active material particle having a coating layer that is on at least a portion of a surface of the cathode active material particle, and a solid electrolyte particle which is in contact with the coating layer, wherein an average particle diameter of the cathode active material secondary particle is in a range of about 3 micrometers to about 10 micrometers, wherein the coating layer is amorphous and contains at least one element selected from metal elements not including nickel, and semi-metal elements, and wherein a mole ratio of the at least one element of the coating layer and all of the metal elements, not including lithium, or semi-metal elements in the cathode active material particle is in a range of about 0.1 mole percent to about 10 mole percent.

19 Claims, 4 Drawing Sheets

(51) Int. Cl.
*H01M 4/1391* (2010.01)
*H01M 10/0562* (2010.01)
*H01M 4/04* (2006.01)
*H01M 10/052* (2010.01)
*H01M 4/38* (2006.01)
*H01M 4/505* (2010.01)
*H01M 4/62* (2006.01)

(52) U.S. Cl.
CPC ..... *H01M 10/052* (2013.01); *H01M 10/0562* (2013.01); *H01M 2300/0068* (2013.01); *Y02T 10/7011* (2013.01)

(56) References Cited

U.S. PATENT DOCUMENTS

| | | | |
|---|---|---|---|
| 2010/0183922 A1 | 7/2010 | Cho et al. | |
| 2010/0216030 A1 | 8/2010 | Maeda | |
| 2010/0221613 A1* | 9/2010 | Ueki | H01M 4/0404 429/231.95 |
| 2010/0310940 A1* | 12/2010 | Kim | B82Y 30/00 429/231.95 |
| 2012/0202124 A1* | 8/2012 | Jeon | H01M 10/0525 429/332 |
| 2012/0231322 A1* | 9/2012 | Chu | H01M 2/1653 429/144 |
| 2014/0093786 A1* | 4/2014 | Ito | H01M 4/62 429/322 |
| 2014/0120423 A1* | 5/2014 | Matsuo | H01M 4/13 429/217 |
| 2015/0024280 A1* | 1/2015 | Uchiyama | H01M 4/505 429/304 |

FOREIGN PATENT DOCUMENTS

| | | |
|---|---|---|
| JP | 1998-074517 A1 | 3/1998 |
| JP | 2005-302507 A | 10/2005 |
| JP | 2009-152214 A | 7/2009 |
| JP | 2010-192373 A | 9/2010 |
| JP | 4982866 B2 | 5/2012 |
| JP | 2013-519187 A | 5/2013 |
| JP | 2013089321 A | 5/2013 |
| JP | 5499992 B2 | 3/2014 |
| JP | 20141-16149 A | 6/2014 |
| KR | 10-0635741 B1 | 10/2006 |
| KR | 1020100095349 A | 8/2010 |

* cited by examiner

LITHIUM SECONDARY BATTERY INCLUDING A COATED CATHODE MATERIAL AND SOLID ELECTROLYTE, AND METHOD OF PREPARING THE SAME

CROSS-REFERENCE TO RELATED APPLICATIONS

This application claims priority to and the benefit of Japanese Patent Application No. 2014-165428, filed on Aug. 15, 2014, in the Japanese Intellectual Property Office, and Korean Patent Application No. 10-2015-0040214, filed on Mar. 23, 2015, in the Korean Intellectual Property Office, and all the benefits accruing therefrom under 35 U.S.C. § 119, the contents of which are incorporated herein in their entirety by reference.

BACKGROUND

1. Field

The present disclosure relates to a lithium secondary battery and a method of preparing the lithium secondary battery.

2. Description of the Related Art

Lithium secondary batteries have high charging/discharging capacity, high driving potential, and good charging/discharging cycle characteristics, and are suitable for a portable information terminal, a portable electronic device, residential electrical energy storage, and vehicles, such as motorcycles, electric vehicles, or hybrid electric vehicles, which use a motor as a driving source.

Lithium secondary batteries use a non-aqueous electrolyte solution prepared by dissolving a lithium salt in an organic solvent as an electrolyte. Safety of the electrolyte is a concern due to easy ignition and leakage of a non-aqueous electrolyte solution. In order to solve this problem, studies on all-solid type lithium secondary batteries, which use a solid electrolyte including an inorganic material, as a non-flammable material, to improve safety of lithium secondary batteries, have been made. Nonetheless, there remains a need for an improved lithium secondary battery.

SUMMARY

Provided is a lithium secondary battery having improved discharge capacity and cycle characteristics.

Provided is a method of preparing the lithium secondary battery.

Additional aspects will be set forth in part in the description which follows and, in part, will be apparent from the description.

According to an aspect, a lithium secondary battery includes a cathode layer; a solid electrolyte layer; and an anode layer, wherein the solid electrolyte layer is between the cathode layer and the anode layer, wherein the cathode layer includes a cathode active material particle having a coating layer on at least a portion of a surface of the cathode active material particle and a solid electrolyte particle which is in contact with the coating layer, wherein the cathode active material particle is a secondary particle and includes an agglomeration a plurality of cathode active material primary particles, each of which is capable of reversibly intercalating and deintercalating lithium ions, where an average particle diameter of the secondary particle is in a range of about 3 micrometers to about 10 micrometers, wherein the coating layer is amorphous and includes at least one element selected from metal elements not including nickel, and semi-metal elements, and wherein a mole ratio of the at least one element of the coating layer and all of the metal elements not including lithium, or semi-metal elements in the cathode active material particle is in a range of about 0.1 mole percent to about 10.0 mole percent.

According to an aspect, a method of preparing a cathode layer of a lithium secondary battery including the cathode layer; a solid electrolyte layer; and an anode layer, wherein the solid electrolyte layer is the cathode layer and the anode layer, the method including: providing a cathode active material secondary particles having an average particle diameter in a range of about 3 micrometers to about 10 micrometers; stirring and heating the cathode active material secondary particle and precursor compound which comprises at least one element selected from metal elements not including nickel, and semi-metal elements to form a loaded cathode active material in which the precursor compound is disposed on a surface of the cathode active material secondary particle;

calcining the loaded cathode active material in an oxidizing atmosphere to form an amorphous coating layer on at least a portion of a surface of the cathode active material secondary particle to form a calcined cathode active material having an amorphous coating layer on at least a portion of a surface of the calcined cathode active material secondary particle; and adding a solid electrolyte particle and a solvent to the calcined cathode active material secondary particle to form a mixture; coating mixture on a current collector; and drying the mixture to prepare the cathode layer of the lithium secondary battery.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
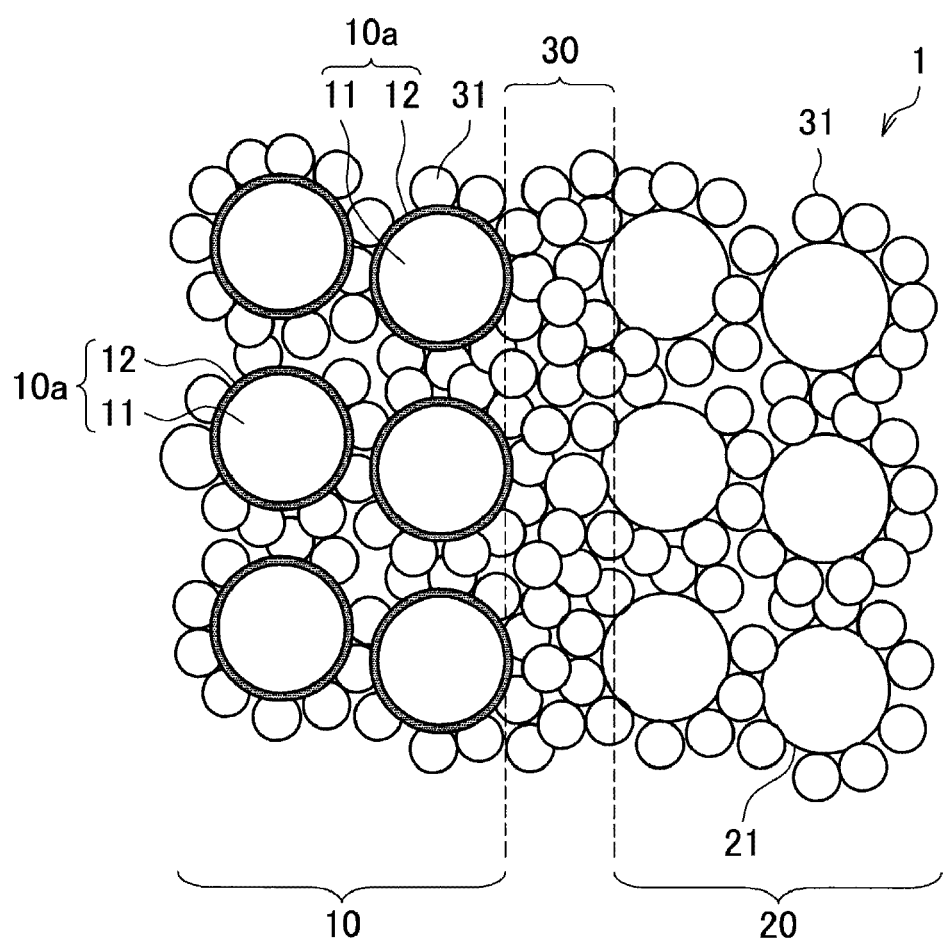
FIG. 1 is a schematic view illustrating a structure of an embodiment of a lithium secondary battery.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A sulfide or an oxide may be used as the solid electrolyte of the all-solid type lithium secondary battery. However, when a sulfide-based solid electrolyte is used, a reaction between cathode active material particles and solid electrolyte particles occurs at an interface therebetween during charging of the battery, and thus resistant components may be generated at the interface, which results an increase in resistance (hereinafter, also referred to as "interface resistance") at the interface between the cathode active material particles and the solid electrolyte particles when the lithium ions move. Due to the increase in the interface resistance, a conductivity of lithium ions decreases, and thus output power of the all-solid type lithium secondary battery may be deteriorated.

Therefore, a lithium secondary battery having improved output of an all-solid type lithium secondary battery and, particularly, improved discharge capacity and cycle characteristics; and a method of preparing the lithium secondary battery are needed.

Hereinafter, a lithium secondary battery according to an exemplary embodiment will be disclosed in further detail.

Problems when a Solid Electrolyte is Used

Figure 3:
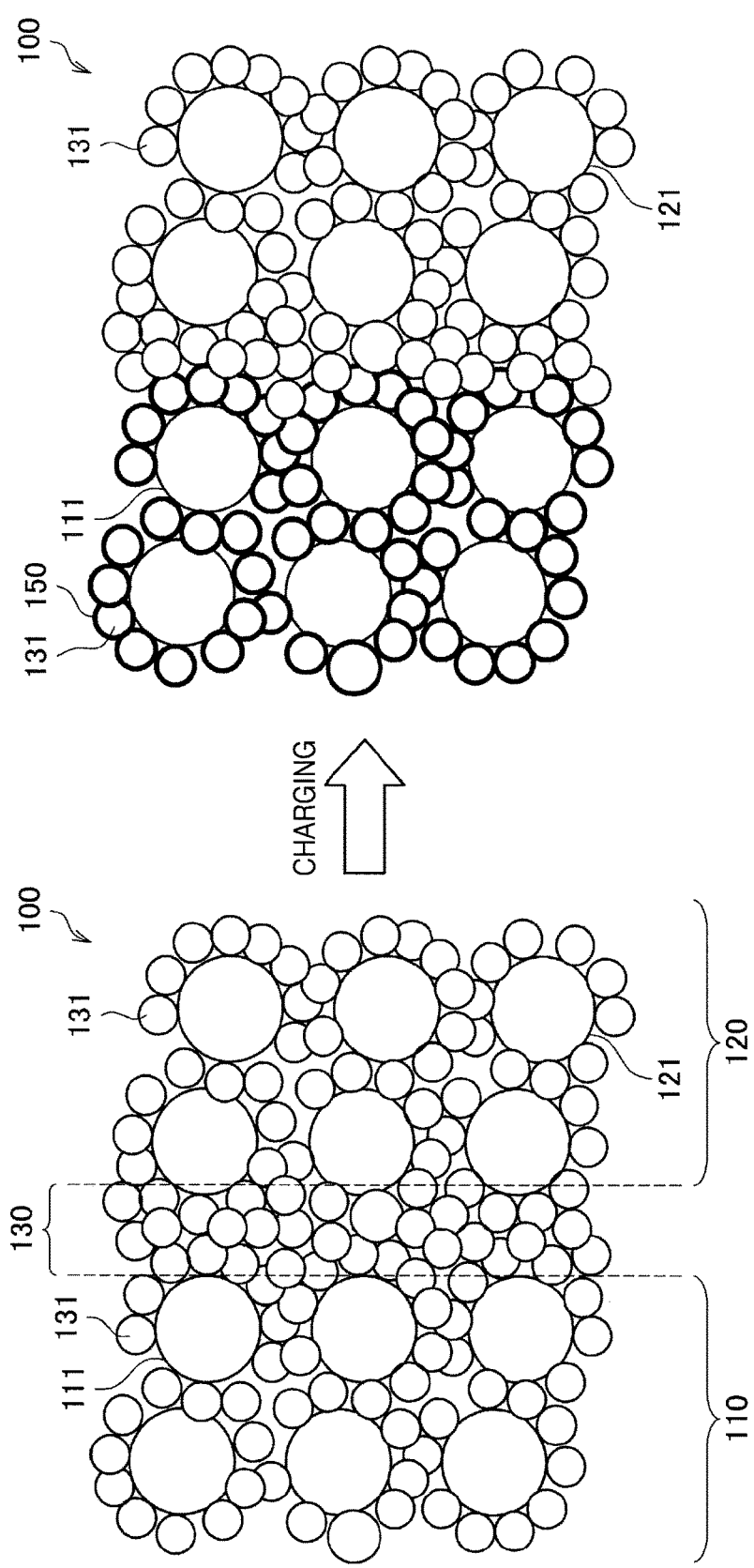
FIG. 3 is a schematic view illustrating a structure of an embodiment of all-solid type lithium secondary battery.

FIG. 3 is a schematic view illustrating a structure of an embodiment of an all-solid type lithium secondary battery 100, hereinafter, also referred to as a "lithium secondary battery 100". Problems caused by using a solid electrolyte will be described by referring to FIG. 3.

The lithium secondary battery 100 has a stacked structure including a cathode layer 110, an anode layer 120, and a solid electrolyte layer 130. The cathode layer 110 is comprised of mixed particles of cathode active material particles 111 and sulfide-based solid electrolyte particles 131, hereinafter, also referred to as "solid electrolyte particles 131".

In the same manner, the anode layer 120 is comprised of mixed particles of anode active material particles 121 and the solid electrolyte particles 131.

The solid electrolyte layer 130 is disposed between the cathode layer 110 and the anode layer 120. The solid electrolyte layer 130 is comprised of the solid electrolyte particles 131.

In the lithium secondary battery 100 including the solid electrolyte, a cathode active material and the electrolyte are in a solid state, and thus the electrolyte may have difficulty penetrating into the cathode active material compared to a battery including an organic electrolyte solution as an electrolyte, and an area of an interface between the cathode active material and the electrolyte may easily decrease. In this regard, pathways for lithium ion and electron transport may not be sufficiently provided in the lithium secondary battery 100.

Accordingly, as shown in FIG. 3, the cathode layer 110 is comprised of the mixed particles of the cathode active material particles 111 and the solid electrolyte particles 131, and the anode layer 120 is comprised of the mixed particles of the anode active material particles 121 and the solid electrolyte particles 131. In this regard, an area of the interface between the active material and the solid electrolyte may be increased.

However, during charging the lithium secondary battery 100, a reaction between the cathode active material particles 111 and the solid electrolyte particles 131 may occur at the interface, and thus a highly resistive layer 150 may be formed. In particular, the highly resistive layer 150 is produced by a reaction (or a side-reaction) between elements such as (transition) metal elements or oxygen present on a surface of the cathode active material particle 111 and sulfur present on a surface of the solid electrolyte particle 131.

Here, the term "highly resistive layer 150" denotes a layer that is comprised of a resistant component formed at an interface between the cathode active material particles 111 and the solid electrolyte particles 131, where a resistance of the layer increases when lithium ions are polarized due a resistance inside the cathode active material particles 111 and/or a resistance of the solid electrolyte particles 131.

Due to formation of the highly resistive layer 150, an interface resistance between the cathode active material particle 111 and the solid electrolyte particle 131 may increase. Also, when an area of the interface between the cathode active material particle 111 and the solid electrolyte particle 131 increases, pathways for lithium ion and electron transport may be secured, but the highly resistive layer 150 may be easily formed, and thus movement of lithium ions from the cathode active material particle 111 to the solid electrolyte particle 131 may be obstructed by the highly resistive layer 150. Therefore, since a lithium ion conductivity decreases, an output of the lithium secondary battery 100 is deteriorated.

Overview of the Present Inventive Concept

In this regard, the present inventors have considered whether other factors affecting an output of the all-solid type lithium secondary battery 100 than the highly resistive layer 150 are present. Also, the present inventors have taken notice of a structure of the cathode active material particle 111.

Figure 4:
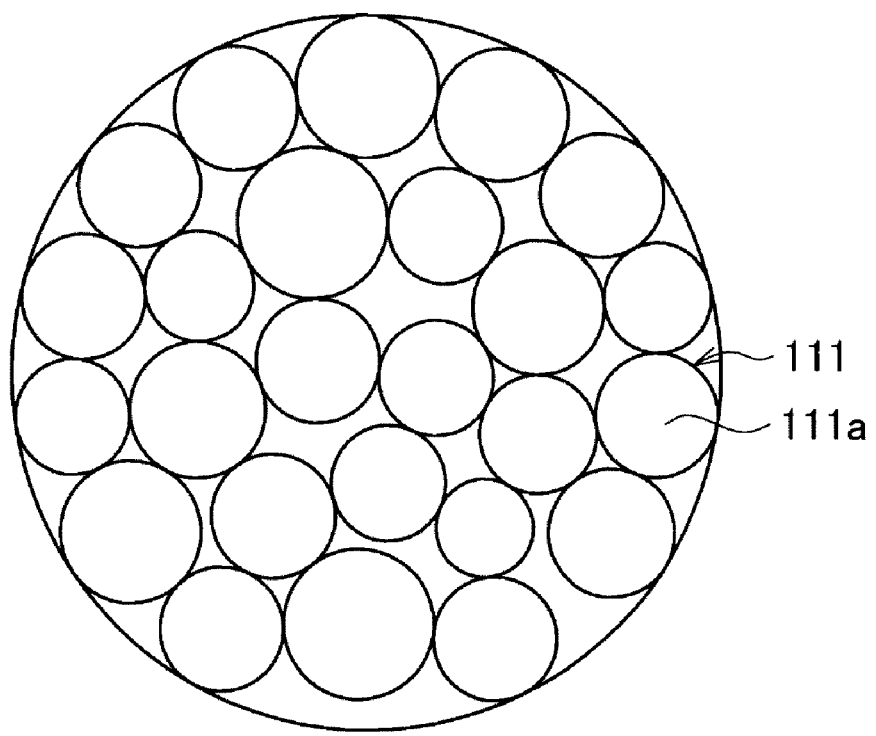
FIG. 4 is a schematic view illustrating a structure of an embodiment of a cathode active material particle.

As shown in FIG. 4, the cathode active material particle 111 is a secondary particle and comprises an agglomeration of a plurality of cathode active material primary particles 111*a*. Also, the solid electrolyte particle 131 may be in contact with the surface of the cathode active material particle 111 but may not squeeze in between adjacent cathode particle material primary particles 111*a*. Therefore, exchanging lithium ions between the cathode active material particle 111 and the solid electrolyte particle 131 is performed on a surface of the cathode active material particle 111. In this regard, a period of time elapsed for the lithium ions to be dispersed throughout an entirety of the cathode active material particle 111 during charging of the battery, or a diffusion time depends on a particle diameter of the cathode active material particle 111, termed a "secondary particle diameter". The present inventors considered whether the diffusion time, that is, the particle diameter of the cathode active material 111, affects an output of the lithium secondary battery 100.

Also, the present inventors have taken notice of a coating layer for suppressing the side reaction described above and considered whether a composition of the coating layer affects an output of the lithium secondary battery 100. Accordingly, the present inventors measured an output of an all-solid type lithium secondary battery while changing a particle diameter of a cathode active material particle and a composition of the coating layer, and the results of the measurement confirmed that the output of the all-solid type lithium secondary battery was unexpectedly significantly improved when the particle diameter of the cathode active material particle and a composition of the coating layer satisfied certain conditions.

Hereinafter, a lithium secondary battery according to an exemplary embodiment will be disclosed in further detail.

Structure of Lithium Secondary Battery

Referring to FIG. 1, a structure of an embodiment of the lithium secondary battery 1 will be disclosed in further detail. FIG. 1 is a schematic view illustrating the structure of an embodiment of the lithium secondary battery 1.

As shown in FIG. 1, the lithium secondary battery 1 is an all-solid type lithium secondary battery and has a stacked structure including a cathode layer 10, an anode layer 20, and a solid electrolyte layer 30 disposed between the cathode layer 10 and the anode layer 20.

The lithium secondary battery 1 includes the cathode layer 10; the solid electrolyte layer 30; and the anode layer 20 that are sequentially stacked in the stated order, wherein the cathode layer 10 includes a cathode active material particle 11 having a coating layer 12 disposed, e.g., formed, on at least a portion of a surface of the cathode active material particle 11 and a solid electrolyte particle 31 in contact with the coating layer 12, wherein the cathode active material particle 11 is a secondary particle that comprises an agglomeration of a plurality of cathode active material primary particles, each of which is capable of reversibly intercalating and deintercalating lithium ions, wherein an average particle diameter of the secondary particle is in a range of about 3 micrometers (μm) to about 10 μm, or about 4 μm to about 8 μm the coating layer 12 is amorphous and includes at least one element selected from metal elements not including nickel, and semi-metal elements, and wherein a mole ratio of the at least one element and all metal elements, not including lithium, or semi-metal elements in the cathode active material particle may be in a range of about 0.1 mole percent (mol %) to about 10 mol %, or about 0.5 mol % to 8 mol %.

Cathode Layer 10

The cathode layer 10 includes mixed particles of the cathode active material particles 10*a* having the coating layer 12 and the solid electrolyte particles 31. The cathode active material particles 10*a* having the coating layer 12 disposed, e.g., formed, thereon includes the cathode active material particle 11 and the coating layer 12 that covers a surface of the cathode active material particle 11. Therefore, the coating layer 12 is in contact with the solid electrolyte particles 31.

As described above, the general lithium secondary battery 100 including the solid electrolyte particle 131 may have a decreased output of the battery as an interface resistance increases due to a reaction at an interface of the cathode active material particle 111 and the solid electrolyte particle 131.

Referring to the all-solid type lithium secondary battery 1, the cathode active material particle 11 may have the coating layer 12, which is disposed, e.g., formed, on at least a portion of the surface of the cathode active material particle 11. That is, the coating layer 12 may be formed on the entire surface of the cathode active material particle 11, or the coating layer 12 may be formed on a portion of the surface of the cathode active material particle 11.

Thus, a side reaction of the solid electrolyte particle 31 and the cathode active material particle 11 may be suppressed, and thus an output of the lithium secondary battery 1 may improve.

The coating layer 12 disposed on the surface of the cathode active material particle 11 may be confirmed by, for example, a microscope image, e.g., images from a field emission scanning electron microscope (FE-SEM) and a transmission electron microscope (TEM)), e.g., by analysis that uses a contrast difference caused by a difference in structures of the cathode active material particle 11 and the coating layer 12.

Hereinafter, the cathode active material particle 11 and the coating layer 12 included in the cathode layer 10 will be further described.

Cathode Active Material Particle 11

Figure 2:
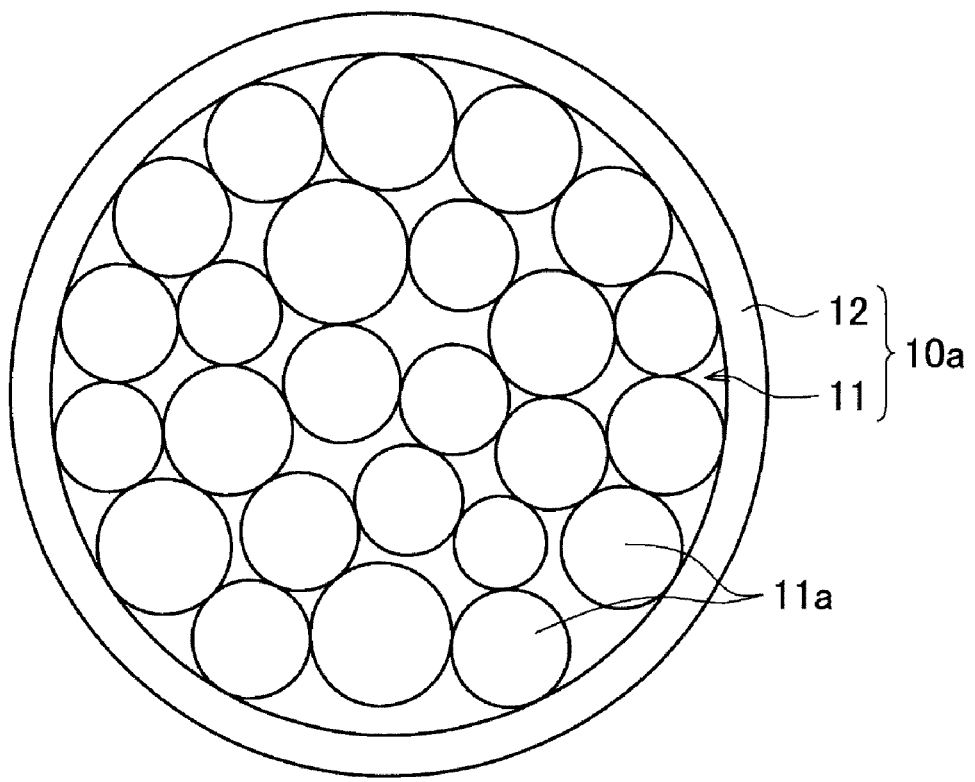
FIG. 2 is a schematic view illustrating a structure of an embodiment of a cathode active material particle on which a coating layer is disposed.

As shown in FIG. 2, the cathode active material particle 11 according to an embodiment may be a secondary particle that comprises an agglomeration of a plurality of cathode active material primary particles 11a, each of which is capable of intercalating and deintercalating lithium. An average particle diameter of the secondary particle may be in a range of about 2 μm to about 10 μm, about 2.5 μm to about 8 μm, about 3 μm to about 6 μm. For example, an average particle diameter of the secondary particle may be in a range of about 3 μm to about 10 μm.

Here, an average particle diameter of the cathode active material particle 11 is a particle diameter that is obtained when the cathode active material particle 11 is assumed to be a sphere. Also, the average particle diameter of the cathode active material particle 11 is a particle diameter D50, i.e., a median particle diameter.

When the average particle diameter of the cathode active material particle 11 is within this range above, an output of the lithium secondary battery 1 may be greatly improved. When the average particle diameter of the cathode active material particle 11 is less than 3 μm, an output, particularly, a discharge capacity, of the lithium secondary battery 1 may decrease. When the average particle diameter of the cathode active material particle 11 is greater than 10 μm, the diffusion time increases, and thus an output of the lithium secondary battery 1 may deteriorate.

Here, the average particle diameter of the cathode active material particle 11 may be measured using a laser diffraction scattering type particle size distribution measuring apparatus (e.g., a micro-track MT-3000II available from Nikkiso Co., Ltd.)

A cathode active material in the cathode active material particle 11 may be any suitable material that is capable of reversibly intercalating and deintercalating lithium ions, and an example of the material may be a compound that is represented by one of the formulae of $Li_aA_{1-b}B'_bD'_2$ (where, $0.90≤a≤1.8$ and $0≤v≤0.5$); $Li_aE_{1-b}B'_bO_{2-c}D'_c$ (where, $0.90≤a≤1.8$, $0≤b≤0.5$, and $0≤c≤0.05$); $LiE_{2-b}B'_bO_{4-c}D'_c$ (where, $0≤b≤0.5$ and $0≤c≤0.05$); $Li_aNi_{1-b-c}Co_bB'_cD'_α$ (where, $0.90≤a≤1.8$, $0≤b≤0.5$, $0≤c≤0.05$, and $0<α≤2$); $Li_aNi_{1-b-c}Co_bB'_cO_{2-α}F_α$ (where, $0.90≤a≤1.8$, $0≤b≤0.5$, $0≤c≤0.05$, and $0<α≤2$); $Li_aNi_{1-b-c}Co_bB'_cO_{2-α}F_2$ (where, $0.90≤a≤1.8$, $0≤b≤0.5$, $0≤c≤0.05$, and $0<α<2$); $Li_aNi_{1-b-c}Mn_bB'_cD'_α$ (where, $0.90≤a≤1.8$, $0≤b≤0.5$, $0≤c≤0.05$, and $0<α≤2$); $Li_aNi_{1-b-c}Mn_bB'_cO_{2-α}F_α$ (where, $0.90≤a≤1.8$, $0≤b≤0.5$, $0≤c≤0.05$, and $0<α<2$); $Li_aNi_{1-b-c}Mn_bB'_cO_{2-α}F_2$ (where, $0.90≤a≤1.8$, $0≤b≤0.05$, $0≤c≤0.05$, and $0<α<2$); $Li_aNi_bE_cG_dO_2$ (where, $0.90≤a≤1.8$, $0≤b≤0.9$, $0≤c≤0.5$, and $0.001≤d≤0.1$; $Li_aNi_bCo_cMn_dG_eO_2$ (where, $0.90≤a≤1.8$, $0≤b≤0.9$, $0≤c≤0.5$, $0≤d≤0.5$, and $0.001≤e≤0.1$); $Li_aNiG_bO_2$ (where, $0.90≤a≤1.8$ and $0.001≤b≤0.1$); $Li_aCoG_bO_2$ (where, $0.90≤a≤1.8$ and $0.001≤b≤0.1$); $Li_aMnG_bO_2$ (where, $0.90≤a≤1.8$ and $0.001≤b≤0.1$); $Li_aMn_2G_bO_4$ (where, $0.90≤a≤1.8$ and $0.001≤b≤0.1$); $LiQO_2$; $LiQS_2$; $LiV_2O_5$; $LiI'O_2$; $LiNiVO_4$; $Li_{(3-f)}J_2(PO_4)_3$ (where, $0≤f≤2$); $Li_{(3-f)}Fe_2(PO_4)_3$ (where, $0≤f≤2$); and $LiFePO_4$.

In the formulae, A is at least one selected from Ni, Co, and Mn; B' is at least one selected from Al, Ni, Co, Mn, Cr, Fe, Mg, Sr, V, and an alkali rare earth element; D' is at least one selected from O, F, S, and P; E is at least one selected from Co and Mn; G is at least one selected from Al, Cr, Mn, Fe, Mg, La, Ce, Sr, and V; Q is at least one selected from Ti, Mo, and Mn; I' is at least one selected from Cr, V, Fe, Sc, and Y; and J is at least one selected from V, Cr, Mn, Co, Ni, and Cu.

For example, examples of the cathode active material may be a lithium cobalt oxide (LCO), a lithium nickel oxide, a lithium nickel cobalt oxide, a lithium nickel manganese oxide, a lithium nickel cobalt aluminum oxide (hereinafter, also referred to "NCA"), a lithium nickel cobalt manganese oxide (hereinafter, also referred to as "NCM"), a lithium manganese oxide, a lithium iron phosphate, a nickel sulfide, a copper sulfide, a sulfur, an iron oxide, or a vanadium oxide. The examples of the cathode active material may be used alone or in a combination of two or more thereof.

For example, the cathode active material particle 11 may include at least one selected from a cathode active material represented by Formula 1 and a cathode active material represented by Formula 2:

$$Li_xNi_yM_{1-y}O_2 \quad \text{Formula 1}$$

wherein, in Formula 1, M may be at least one element selected from the group Co, Mn, Al, and Mg, and x and y may satisfy $0.5<x<1.4$ and $0.3<y$, and

$$Li_aNi_bM'_{2-b}O_4 \quad \text{Formula 2}$$

wherein, in Formula 2, M' may be at least one selected from Co and Mn, and a and b may satisfy $0.5<a<1.1$ and $0.3<b$.

The cathode active material represented by Formula 1 may be, for example, $LiNi_{0.8}Co_{0.15}Al_{0.05}O_2$, $LiNi_{1/3}Co_{1/3}Mn_{1/3}O_2$, $LiNi_{0.5}Co_{0.2}Mn_{0.3}O_2$, or $LiNi_{0.8}Co_{0.1}Mn_{0.1}O_2$. Also, $Li_{1.15}(Ni_{0.2}Co_{0.2}Mn_{0.6})_{0.85}O_2$ does not have a composition of Formula 1 and may be used as the cathode active material. For example, the cathode active material represented by Formula 2 may include $LiNi_{0.5}Mn_{1.5}O_4$.

In this regard, the cathode active material particle 11 may include a large amount of nickel ($y>0.3$ or $b>0.3$). The cathode active material particle 11 including a large amount of nickel may increase a discharge capacity of the lithium secondary battery 1. On the other hand, a diffusion rate of lithium ions in the cathode active material particle 11 including a large amount of nickel can be slow, for example, slower than a diffusion rate of a lithium cobalt oxide, and thus cycle characteristics of the cathode active material particle 11 may be deteriorated. However, when the average particle diameter of the cathode active material particle 11 is within this range, a discharge capacity and cycle characteristics of the cathode active material particle 11 may be improved.

Among the cathode active materials represented by Formula 1 or Formula 2, may be NCA or NCM. The cathode active material may have a layered rock-salt structure.

Here, the term "layered" denotes a shape of thin sheet, and the term "rock-salt structure" denotes a sodium chloride-type structure as a crystal structure in which face-centered cubic lattices respectively formed of anions and cations are dislocated by only a half of the side of each unit lattice. The cathode active material particle 11 comprised of NCA and NCM has a particle diameter that is smaller than that of a LCO particle and a specific surface area that is about 10 times greater than that of the LCO particle.

Accordingly, a contact area between the cathode active material particle 11 and the solid electrolyte particle 31 increases, and thus an output of the lithium secondary battery 1 may increase to improve lithium ion conductivity. Also, when nickel is included in the cathode active material particle 11, long-term reliability of the lithium secondary battery 1 in the charged state may improve since a capacity density of the lithium secondary battery 1 increases and an amount of metal dissolution in the charged state of the battery is small.

Coating Layer 12

The coating layer 12 covers at least a portion of the surface of the cathode active material particle 11. Also, the coating layer 12 includes at least one element selected from metal elements not including nickel, and semi-metal elements.

The coating layer 12 may further include lithium.

The coating layer 12 may be amorphous. Also, a mole ratio (e.g., an atom number ratio) of the at least one element and all the metal elements, not including lithium, or semi-metal elements, in the cathode active material particle 11 may be in a range of about 0.1 mol % to about 10.0 mol %, about 0.5 mol % to about 8 mol %, or about 1 mol % to about 6 mol %. The mole ratio may be obtained by dividing a mole number (an atom number) of the at least one element by a mole number (an atom number) of all the metal elements, not including lithium, or semi-metal elements, in the cathode active material particle 11. Hereinafter, the mole ratio is also referred to as "a coating amount of the coating layer 12".

Here, the at least one element of the coating layer may be at least one selected from metal elements not including nickel, and semi-metal elements. The at least one element of the coating layer may be at least one selected from Y, La, Ce, Nd, Sm, Eu, Ti, Zr, V, Nb, Cr, Mn, Fe, Co, Cu, Zn, Al, Si, Ga, Ge, and In. The at least one element of the coating layer may be at least one selected from Y, La, Ce, Ti, Zr, Nb, Al, Ga, and In. The at least one element of the coating layer may be any one selected from the elements above, not including Zr.

The coating layer 12 may have the composition described above, may suppress a side reaction between an element present on a surface of the cathode active material particle 11 and an element present on a surface of the solid electrolyte particle 31, and, moreover, may improve an output of the lithium secondary battery 1.

Other Additives

The cathode layer 10 may include additives, for example, a conducting agent, a binding agent, an electrolyte, a filler, a dispersing agent, and an ion conducting agent, which may be appropriately selected and combined, in addition to particles of the cathode active material particle 10a having the coating layer 12.

Examples of the conducting agent may include graphite, carbon black, acetylene black, ketjen black, carbon fibers, and a metal powder.

Examples of the binding agent may include polytetrafluoroethylene, polyvinylidene fluoride, and polyethylene. The examples of the binding agent may be used alone or in a combination thereof.

Examples of the electrolyte may include a sulfide-based solid electrolyte, which will be described in detail. Also, the filler, the dispersing agent, and the ion conducting agent may be commercially available materials for the manufacture of an electrode of a lithium secondary battery.

Solid Electrolyte Layer 30

The solid electrolyte layer 30 includes the solid electrolyte particle 31. The solid electrolyte particle 31 may be, for example, a sulfide-based solid electrolyte particle. The solid electrolyte particle 31 may be a sulfide-based solid electrolyte particle containing at least one element selected from the group consisting of silicon, phosphorus, and boron. The sulfide-based solid electrolyte particle may be at least one selected from $Li_2S$, $P_2S_5$, $SiS_2$, $GeS_2$, and $B_2S_3$. The sulfide-based solid electrolyte particle may be $Li_2S$ or $P_2S_5$. The sulfide-based solid electrolyte particle is known for its high lithium ion conductivity compared to that of other inorganic compound. Also, $Li_3PO_4$, halogen, or a halogen compound may be appropriately added to the solid electrolyte particle 31.

Anode Layer 20

The anode layer 20 includes the anode active material particle 21 and the solid electrolyte particle 31 in contact with the anode active material particle 21.

Anode Active Material Particle 21

The anode active material particle 21 included in the anode layer 20 may include any suitable material that is alloyable with lithium or capable of reversibly intercalating and deintercalating lithium ions, and examples of the material may include metals such as lithium, indium, tin, aluminum, and silicon and alloys thereof; a transition metal oxide such as $Li_{4/3}Ti_{5/3}O_4$ or SnO; and carbon materials such as artificial graphite, graphite carbon fibers, resin calcined carbon, thermal decomposition vapor-phase grown carbon, cokes, meso-carbon micro-beads (MCMBs), furfuryl alcohol resin calcined carbon, polyacene, pitch-based carbon fibers, vapor-phase grown carbon fibers, natural graphite, and non-graphitizable carbon. The examples of the anode active material particle 21 may be used alone or in a combination thereof.

Other Additives

The anode layer 20 may include additives, for example, a conducting agent, a binding agent, an electrolyte, a filler, a dispersing agent, and an ion conducting agent, which may be appropriately selected and combined, in addition to particles of the anode active material particle 21. Materials of the additives may be the same as used in the cathode layer 10.

Preparation Method of Lithium Secondary Battery

A structure of the lithium secondary battery 1 according to an embodiment has been described thus far, and a method of preparing the lithium secondary battery 1 having the structure above will be further described in detail hereinafter. The lithium secondary battery 1 may be manufactured by first preparing the cathode layer 10, the anode layer 20, and the solid electrolyte layer 30, and then stacking each of the layers.

The method of preparing the lithium secondary battery 1 is a method which comprises providing, e.g., preparing, a lithium secondary battery including a cathode layer; a solid electrolyte layer; and an anode layer that are stacked in the stated order so that the solid electrolyte layer is between the cathode layer and the anode layer, and the method includes providing, e.g., preparing, a cathode active material secondary particle having an average particle diameter in a range of about 3 μm to about 10 μm; disposing a precursor of a coating layer on a surface of the cathode active material secondary particle by stirring and heating the cathode active material secondary particle with a coating solution including a precursor compound of at least one precursor compound of the at least one element of the coating layer that is selected from metal elements not including nickel, and semi-metal elements; calcining the precursor of the coating layer which is disposed on the surface of the cathode active material secondary particle under an oxidizing atmosphere to form an amorphous coating layer on at least a portion of the surface of the cathode active material secondary particle; and preparing a cathode layer by adding a solid electrolyte particle and a solvent to the cathode active material secondary particle on which the amorphous coating layer is formed on at least a portion of the surface thereof to prepare a cathode mixture; and coating and drying the cathode mixture on a current collector to prepare the lithium secondary battery.

Hereinafter, each of the process will be further disclosed.
Preparation of Cathode Active Material Particle 11

The cathode active material particle 11 is prepared as follows. A preparation method of the cathode active material particle 11 is not particularly limited, and, for example, a co-deposition method may be used.

Hereinafter, the preparation method of the cathode active material particle 11 using a co-deposition method will be described as an example. The cathode active material particle 11 may be a secondary particle that is formed when a plurality of cathode active material primary particles agglomerate and bond to each other.

The cathode active material particle 11 having an average particle diameter in a range of about 3 μm to about 10 μm is prepared.

In the process of preparing the cathode active material particle 11 having an average particle diameter in a range of about 3 μm to about 10 μm, the cathode active material secondary particle may include at least one of a cathode active material represented by Formula 1 and a cathode active material represented by Formula 2:

$$Li_xNi_yM_{1-y}O_2 \quad \text{Formula 1}$$

wherein, in Formula 1, M may be at least one element selected from Co, Mn, Al, and Mg, and x and y may satisfy $0.5<x<1.4$ and $0.3<y$.

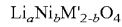

$$Li_aNi_bM'_{2-b}O_4 \quad \text{Formula 2}$$

wherein, in Formula 2, M' may be at least one element selected from Co and Mn, and a and b may satisfy $0.5<a<1.1$ and $0.3<b$.

First, a hydrated nickel sulfate (e.g., $NiSO_4 \cdot 6H_2O$) and a compound including a metal element M or M' selected from the cathode active materials represented by Formula 1 or Formula 2 are dissolved in an ion exchange water to prepare a mixed aqueous solution. The metal element may be a transition metal element.

Here, the total weight of the hydrated nickel sulfate and the compound including the metal element M or M' selected from the cathode active materials represented by Formula 1 or Formula 2 may be, for example, about 20 wt %, based on the total weight of the mixed aqueous solution. The hydrated nickel sulfate and the compound including a metal element M or M' selected from the cathode active materials represented by Formula 1 or Formula 2 are mixed so that a desired mole ratio of Ni and M or M' is the desired ratio. Also, the mole ratio of Ni and M or M' is determined by a composition of the lithium nickel composite oxide thus prepared, but, for example, when $LiNi_{0.8}Co_{0.15}Al_{0.05}O_2$ is prepared, a mole ratio of Ni:Co:Al may be 80:15:5.

In addition, a predetermined amount (e.g., 500 mL) of ion exchange water is added to the reaction layer, and a temperature of the ion exchange water is maintained at 50° C.° C. Hereinafter, an aqueous solution of the reaction layer is referred to as a reaction layer aqueous solution. Next, the ion exchange water is bubbled by using an inert gas, such as nitrogen, to remove oxygen dissolved in the ion exchange water.

Then, the ion exchange water in the reaction layer is stirred, and the mixed aqueous solution is added to the ion exchange water while maintaining the temperature of the ion exchange water at 50° C. A saturated NaOH aqueous solution is then added to the ion exchange water at a large amount with respect to those of Ni, Co, and Al. Also, pH of the reaction layer aqueous solution is maintained at 11.5, and a temperature at 50° C. Rates of adding the mixed aqueous solution and the saturated NaOH aqueous solution are not particularly limited, but a homogenous precursor (a co-precipitate hydroxide salt) may not be obtained if the rates are too high. For example, a rate of adding the solution may be 3 ml/minutes. The adding of the mixed aqueous solution and the saturated NaOH aqueous solution may be performed for a predetermined period of time, for example, about 10 hours. Accordingly, a hydroxide salt of each of the metal elements is co-precipitated.

Subsequently, solid-liquid separation (for example, suction filtration) is performed, the co-precipitate hydroxide salts are extracted from the reaction layer aqueous solution, and then the extracted co-precipitate hydroxide salts are washed with an ion exchange water and dried in vacuum. Here, the drying may be performed at a temperature of, for example, about 100° C. and for about 10 hours.

Next, the dried co-precipitated hydroxide salt is pulverized in a mortar for a several minutes to obtain a dried powder. Then, the dried powder and lithium hydroxide (LiOH) are mixed to prepare a mixed powder. Here, a mole ratio of Li and Ni+M(=Me) is determined by a composition of a lithium nickel composite oxide. For example, in order to prepare $LiNi_{0.8}Co_{0.15}Al_{0.05}O_2$, a mole ratio of Li and Me(=Ni+Co+Al) is 1.0:1.0. Here, Me denotes all the (transition) metal elements, not including lithium, in the cathode active material.

Also, the mixed powder is calcined. Also, nickel atoms in the mixed powder are easily reduced, and thus the calcining process may be performed under an oxidizing atmosphere. The oxidizing atmosphere may be, for example, an oxygen atmosphere. A period of time and a temperature for the calcining process may be arbitrarily controlled. The temperature for the calcining process may be, for example, in a range of about 700° C. to about 800° C., and the period of time for the calcining process may be, for example, about 10 hours. Through the process described above, the cathode active material particle 11 is prepared.

The cathode active material particle 11 thus prepared has a particle size distribution. Classification may be performed so that an average particle diameter of the cathode active material particle 11 is a desired value. The cathode active material particle 11 may be, for example, classified into an arbitrary average particle diameter by using a centrifugal-type classifier (e.g., Pico line manufactured by Hosokawa Micron). The average particle diameter of the cathode active material particle 11 may be measured by using a laser diffraction scattering type particle size distribution measuring apparatus (e.g., a micro-track MT-3000II available from Nikkiso Co., Ltd.).

Method of Preparing Cathode Active Material Particle 10a Having Coating Layer Formed Thereon Next, a method of preparing a cathode active material particle 10a having a coating layer formed thereon will be described. The method includes loading a precursor of a coating layer on a surface of a cathode active material secondary particle and forming an amorphous coating layer on at least a part of the surface of the cathode active material secondary particle.

In the process of loading a precursor of a coating layer on a surface of a cathode active material secondary particle, a coating solution may further include a lithium precursor compound and at least one solvent selected from alcohol, ethyl acetoacetate, and water. The lithium precursor compound may be, for example, a lithium alkoxide, and a precursor compound of the at least one element of the coating layer may be an alkoxide of the at least one element.

First, the lithium alkoxide and the alkoxide of the at least one element are stirred and mixed in a solvent selected from alcohol, ethyl acetoacetate, and water to prepare an alcohol solution (a coating solution) including lithium and the at least one element. The at least one element may be at least one selected from Y, La, Ce, Nd, Sm, Eu, Ti, Zr, V, Nb, Cr, Mn, Fe, Co, Cu, Zn, Al, Si, Ga, Ge, and In. The at least one element may be at least one selected from Y, La, Ce, Ti, Zr, Nb, Al, Ga, and In.

The lithium alkoxide and the alkoxide of the at least one element may be obtained by reacting an organic material (e.g., organolithium) including lithium and the at least one element and alcohol. Also, a period of time for stirring and mixing is not particularly limited but may be, for example, about 30 minutes. Also, a compound having a structure of $CH_3-CO-CH_2-CO-O-R$, such as ethyl acetoacetate, includes two carbonyl groups in the structure which function as a chelating agent and have an effect of stabilizing an unstable metal, and thus the compound may serve as a stabilizing agent of the alkoxide of the at least one element.

Next, the coating solution is mixed with the cathode active material particle 11. Here, when a coating amount of the coating layer 12 is n, a mole (an atom number) of the at least one element included in the alkoxide of the at least one element is n1, and a mole (an atom number) of all metal elements, not including lithium, or semi-metal elements, in the cathode active material particle 11 is n2, n is defined as n1/n2*100.

Subsequently, the mixed solution of the coating solution and the cathode active material particle 11 is heated to a temperature of about 40° C. while stirring to completely evaporate all the solvent, such as alcohol. The evaporation of the solvent is performed while irradiating ultrasound waves to the mixture solution. In this regard, a precursor of the coating layer 12 on a surface of the cathode active material particle 11 may be loaded.

The precursor of the coating layer 12 loaded in the surface of the cathode active material particle 11 is calcined under an oxidizing atmosphere, and thus an amorphous coating layer is formed on at least a part of the surface. Here, a temperature of the calcining process may be lower than 400° C. When the temperature of the calcining process is lower than 400° C., the coating layer 12 may be amorphous. A period of time for the calcining process is not particularly limited but may be, for example, in a range of about 1 hour to about 2 hours. The calcining process may be performed while providing an oxygen gas thereto. By providing the oxygen gas, reduction of nickel in the cathode material including nickel is suppressed, and a capacity of the cathode material may be maintained.

In the forming of the amorphous coating layer on at least a part of the surface, a mole ratio of the at least one element and all the metal elements, not including lithium, or semi-metal elements, in the cathode active material secondary particle may be in a range of about 0.1 mol % to about 10 mol %.

Through the process described above, a surface of the cathode active material particle 11 may be coated with the coating layer 12. That is, the cathode active material particle 10a having a coating layer formed thereon may be prepared.

Method of Preparing Solid Electrolyte Particle 31

A method of preparing the solid electrolyte particle 31 is not particularly limited and a general method may be used. The solid electrolyte particle 31 may be a sulfide-based solid electrolyte particle. The sulfide-based solid electrolyte particle may be at least one selected from $Li_2S$, $P_2S_5$, $SiS_2$, $GeS_2$, and $B_2S_3$.

For example, the solid electrolyte particle 31 may be prepared by using a melt quenching method or a mechanical milling method. Hereinafter, as an example of the method of preparing the solid electrolyte particle 31, a method of preparing the solid electrolyte particle 31 including $Li_2S$ and $P_2S_5$ will be described.

When the solid electrolyte particle 31 is prepared by using a melt quenching method, predetermined amounts of $Li_2S$ and $P_2S_5$ are mixed into a pellet phase, reacted at a predetermined reaction temperature in vacuum, and quenched to obtain a sulfide-based solid electrolyte.

Here, the reaction temperature may be in a range of about 400° C. to about 1000° C., or, for example, about 800° C. to about 900° C. Also, a period of time for the reaction may be in a range of about 0.1 hour to about 12 hours, or, for example, about 1 hour to about 12 hours. Also, a temperature of the quenching may be, for example, about 10° C. or lower, or, for example, about 0° C. or lower, and a rate of the cooling may be in a range of, for example, 1 Kelvin per second (K/sec) to about 10000 K/sec, or, for example, about 1 K/sec to about 1000 K/sec.

When the solid electrolyte particle 31 is prepared using a mechanical milling method, predetermined amounts of $Li_2S$ and $P_2S_5$ are mixed and reacted by using a mechanical milling method for a predetermined period of time to obtain a sulfide-based solid electrolyte.

The mechanical milling method using starting materials, such as $Li_2S$ and $P_2S_5$, may be performed at room temperature. When the mechanical milling method is used, since a solid electrolyte may be prepared at room temperature, thermal decomposition of the starting materials does not occur, and the solid electrolyte thus prepared may have the desired composition. A rate and a period of time of rotation of the mechanical milling method are not particularly limited, but, when the rate of rotation is high, a production rate of the solid electrolyte increases, and, when the period of time of rotation increases, a conversion ratio from the starting materials to the solid electrolyte increases.

Then, the solid electrolyte thus prepared is heat treated at a predetermined temperature, and then the resultant is pulverized to the solid electrolyte particle 31. A mixing ratio of the sulfide including $Li_2S$ and $P_2S_5$ may be in a mole ratio of, for example, about 50:50 to about 80:20, or, for example, about 60:40 to about 75:25.

Preparation of Cathode Layer 10

A cathode mixture is prepared by adding a solid electrolyte particle and a solvent to the cathode active material secondary particle having an amorphous coating layer on at least a surface thereof, and the cathode mixture is coated and dried on a current collector to prepare a cathode layer.

In particular, a mixture of the cathode active material particle 10a having the coating layer, the solid electrolyte particle 31, and additives may be added to a solvent to prepare the cathode mixture in a form of slurry or paste.

Here, the solvent may be any solvent is not particularly limited as long as it may be used in preparation of a cathode mixture, but the solvent may be a non-polar solvent. The non-polar solvent does not easily react with the solid electrolyte particle 31. Subsequently, the cathode mixture thus prepared is coated and dried on a current collector by using a doctor blade. Then, the current collector and a layer of the cathode mixture are compressed by using a roll-press to prepare the cathode layer 10.

Here, the current collector may be, for example, a plate-like or a thin-shaped body comprised of stainless steel, titanium, aluminum, or an alloy thereof. Also, when the current collector is not used, the cathode mixture may be press-molded into a form of pellet to prepare the cathode layer 10.

Preparation of Anode Layer 20

The anode layer 20 may be prepared as follows. For example, a mixture of the anode active material particle 21, the solid electrolyte particle 31, and additives are added to a solvent to prepare an anode mixture in a form of slurry or paste. Here, the solvent is not particularly limited as long as it may be used in preparation of an anode mixture, but the solvent may be a non-polar solvent. The non-polar solvent does not easily react with the solid electrolyte particle 31. Subsequently, the anode mixture thus prepared is coated and dried on a current collector by using a doctor blade. Then, the current collector and a layer of the anode mixture are compressed by using a roll-press to prepare the anode layer 20.

Here, the current collector may be, for example, a plate-like or a thin-shaped body comprised of copper, stainless steel, titanium, aluminum, or an alloy thereof. Also, when the current collector is not used, the mixture of the anode active material particle 21 and additives may be press-molded into a form of pellet to prepare the anode layer 20. Also, when the anode active material particle 21 is formed of a metal or an alloy thereof, a metal sheet (a thin layer) may be used as it is.

Preparation of Solid Electrolyte Layer 30

The solid electrolyte layer 30 is prepared as follows. The solid electrolyte particle 31 may be used in a known layer-forming method, for example, a blast method, an aerosol deposition method, a cold spray method, a sputtering method, a chemical vapor deposition (CVD) method, or a spray method to prepare the solid electrolyte layer 30.

Also, a solution prepared by mixing the solid electrolyte particle 31, a solvent, and a binder (an adhesive and a polymer compound) is coated on a support, the solvent is removed, and then the solid electrolyte layer 30 is prepared by using a layer-forming method. Also, the solid electrolyte particle 31 itself or an electrolyte prepared by mixing the solid electrolyte particle 31, a binder (an adhesive and a polymer compound), and a support (which is a material or a compound that enhances a strength of the solid electrolyte layer 30 and prevents short-circuit of the solid electrolyte particle 31) is pressed to form a layer.

Stacking Layers

The cathode layer 10, the solid electrolyte layer 30, and the anode layer 20 thus prepared are sequentially stacked in the stated order and then pressed to prepare the lithium secondary battery 1.

Thereinafter, one or more embodiments of the present inventive concept will be described in detail with reference to the following examples. However, these examples are not intended to limit the scope of the one or more embodiments of the present inventive concept.

EXAMPLES

Example 1

Preparation of Cathode Active Material Particle 11

In Example 1, the cathode active material particle 10a having a coating layer formed thereon was prepared as follows. Nickel sulfate hydrate ($NiSO_4 \cdot 6H_2O$), cobalt sulfate hydrate ($CoSO_4 \cdot 5H_2O$), and aluminum nitrate (Al $(NO_3)_3$) were dissolved in an ion exchange water to prepare a mixed aqueous solution. Here, the total weight of nickel sulfate hydrate, cobalt sulfate hydrate, and aluminum nitrate was 20 wt % based on the total weight of the mixed aqueous solution. Also, a mixing ratio of nickel sulfate hydrate, cobalt sulfate hydrate, and aluminum nitrate was set so that a mole ratio of Ni, Co, and Al were Ni:Co:Al=80:15:5.

Also, a predetermined amount (e.g., 500 ml) of an ion exchange water was added to a reaction layer, and a temperature of the ion exchange water was maintained at 50° C. Next, the ion exchange water was bubbled with nitrogen gas to remove oxygen dissolved in the ion exchange water.

Then, while stirring the ion exchange water in the reaction layer and maintaining the temperature of the ion exchange water at 50° C., the mixed aqueous solution was added to the ion exchange water. Also, a large amount of the saturated NaOH aqueous solution was added to the ion exchange water with respect to the amounts of Ni, Co, and Al. During the adding, pH of the reaction layer aqueous solution was maintained at 11.5, and a temperature of the reaction layer aqueous solution was maintained at 50° C. An adding rate of the mixed aqueous solution and the saturated NaOH aqueous solution was about 3 mL/min. Also, a stirring rate of the mixture was in a range of about 4 meters per second (m/s) to about 5 m/s of a peripheral speed. The adding of the mixed aqueous solution and the saturated NaOH aqueous solution was performed for about 10 hours. In this regard, hydroxide salts of the metal elements were co-precipitated.

Then, the mixture was filtered by suction filtration, a co-precipitate hydroxide salt was purged in the reaction layer aqueous solution, the purged co-precipitate hydroxide salt was washed with an ion exchange water. Also, the co-precipitate hydroxide salt was vacuum dried. A temperature of the vacuum drying was about 100° C., and the vacuum drying was performed for about 10 hours.

Next, the co-precipitate hydroxide salt after the vacuum drying was pulverized for several minutes by using a mortar to obtain a dry powder. The dry powder and a lithium hydroxide (LiOH) were mixed to produce a mixed powder. Here, a mole ratio of Li and Me, which was Li:Ni+Mn+Al (=Me), was 1.0:1.0.

Moreover, the mixed powder was calcined in an oxidizing atmosphere. A temperature of the calcining was in a range of about 700° C. to about 800° C., and the calcining was performing for 10 hours. Through the process described above, the cathode active material particle 11 prepared according to Example 1, hereinafter, also referred to as "cathode active material particle 11-1," was prepared.

Then, an average particle diameter (D50) of the cathode active material particle 11-1 was measured by using a laser diffraction scattering type particle size distribution measuring apparatus (e.g., a micro-track MT-3000II available from Nikkiso Co., Ltd.), and the result was about 7.0 μm.

Preparation of Cathode Active Material Particle 10a Having Coating Layer

In Example 1, the cathode active material particle 10a having a coating layer was prepared as follows. 0.2 g of 10% lithium methoxide methanol solution and lanthanum (III)

propoxide were mixed with a mixture solution including tetrahydrofuran and ethyl acetoacetate for 30 minutes. The cathode active material particle 11-1 was added to the mixed solution. Here, a mole number n1 of lanthanum included in the lanthanum (III) propoxide and a mole number n2 of all metal elements, not including lithium, in the cathode active material particle 11-1 were prepared so that a coating amount of the coating layer 12 was 1.0 mol % (that is, a ratio of n1 and n2 was 1.0 mol %).

Subsequently, a solvent in the mixed solution was all evaporated by heating and stirring the mixed solution at a temperature of 40° C. Evaporation of the solvent was performed by irradiating ultrasound waves to the mixed solution. In this regard, a reaction precursor of a lithium-lanthanum oxide was loaded on a surface of the cathode active material particle 11-1.

In addition, the precursor of the lithium-lanthanum oxide loaded on a surface of the cathode active material particle 11-1 was calcined at a temperature of 350° C. for 1 hour while blowing oxygen thereto. In this regard, the cathode active material particle 10a having a coating layer (hereinafter, also referred to as "cathode active material particle 10a-1 having a coating layer") prepared in Example 1 was obtained. The coating layer 12 prepared in Example 1 was comprised of a lithium-lanthanum oxide, and a coating amount of the coating layer 12 was 1.0 mol %. Also, as the result of performing powder X-ray diffraction measurement on the cathode active material particle 10a having a coating layer, only peaks derived from the cathode active material were confirmed, Therefore, the coating layer 12 was confirmed as amorphous.

Preparation of Solid Electrolyte Particle 31

$Li_2S$ and $P_2S_5$ were mixed by using a mechanical milling method (MM method) at a mol ratio of 80/20 to obtain the solid electrolyte particle 31. An average particle diameter (D50) of the solid electrolyte particle 31 was about 10 μm. Here, the average particle diameter of the solid electrolyte particle 31 was an average particle diameter of a secondary particle of the sold electrolyte particle 31. Also, when measuring the average particle diameter, the secondary particle was considered as having a spherical shape. The measurement was performed by using a micro-track MT-3000II (available from Nikkiso Co., Ltd.).

Preparation of Lithium Secondary Battery

The lithium secondary battery 1 was prepared as follows. The following process was all performed under an inert gas atmosphere.

The cathode active material particle 10a-1 having a coating layer, the solid electrolyte particle 31, and a carbon black powder, as a conducting agent, at a weight ratio of 60:35:5 were mixed by using a mortar to obtain a cathode mixture. 30 mg of the cathode mixture was placed in a pressing jig to press-mold the cathode mixture at a pressure of 2 ton/cm$^2$, and the cathode mixture was thus pelletized. The pelletized cathode mixture was stacked on a stainless steel current collector to prepare the cathode layer 10.

Subsequently, 100 mg of the solid electrolyte particle 31 was placed in a pressing jig and press-molded at a pressure of 2 ton/cm$^2$ to prepare the solid electrolyte layer 30. The cathode layer 10 was then added to the pressing jig to integrate the solid electrolyte layer 30 and the cathode layer 10.

Then, 30.0 mg of a graphite powder (which was vacuum-dried at a temperature of 80° C. for 24 hours), as an anode mixture, was place in the pressing jig so that the solid electrolyte layer 30 is disposed between the cathode layer 10 and the anode layer 20, and press-molded at a pressure of 4 ton/cm$^2$. In this regard, the solid electrolyte layer 30 and the anode layer 20 were integrated.

Example 2

A lithium secondary battery was manufactured in the same manner as in Example 1, except that a coating amount of the coating layer 12 was about 0.1 mol %.

Example 3

A lithium secondary battery was manufactured in the same manner as in Example 1, except that a coating amount of the coating layer 12 was about 10.0 mol %.

Example 4

A lithium secondary battery was manufactured in the same manner as in Example 1, except that the cathode active material particle 11-1 was classified to prepare the cathode active material particle 11 having an average particle diameter of 3.0 μm.

Example 5

A lithium secondary battery was manufactured in the same manner as in Example 1, except that the cathode active material particle 11-1 was classified to prepare the cathode active material particle 11 having an average particle diameter of 10.0 μm.

Example 6

A lithium secondary battery was manufactured in the same manner as in Example 1, except that 0.2 g of 10% lithium methoxide methanol solution and yttrium (III) propoxide were mixed in an isopropanol solution for 30 minutes, and that the cathode active material particle 10a having a coating layer was prepared in the same manner as in Example 1.

Example 7

A lithium secondary battery was manufactured in the same manner as in Example 1, except that cerium (IV) propoxide was used instead of lanthanum propoxide, and that the cathode active material particle 10a having a coating layer was prepared in the same manner as in Example 1.

Example 8

A lithium secondary battery was manufactured in the same manner as in Example 1, except that 0.2 g of 10% lithium methoxide methanol solution and aluminum (III) propoxide were mixed in an isopropanol solution for 30 minutes, and that the cathode active material particle 10a having a coating layer was prepared in the same manner as in Example 1.

Example 9

A lithium secondary battery was manufactured in the same manner as in Example 1, except that 0.2 g of 10% lithium methoxide methanol solution and gallium (III) propoxide were mixed in an isopropanol solution for 30 minutes, and that the cathode active material particle 10*a* having a coating layer was prepared in the same manner as in Example 1.

Example 10

A lithium secondary battery was manufactured in the same manner as in Example 1, except that 0.2 g of 10% lithium methoxide methanol solution and indium (III) propoxide were mixed in an isopropanol solution for 30 minutes, and that the cathode active material particle 10*a* having a coating layer was prepared in the same manner as in Example 1.

Example 11

A lithium secondary battery was manufactured in the same manner as in Example 1, except that 0.2 g of 10% lithium methoxide methanol solution and titanium (IV) propoxide were mixed in an isopropanol solution for 30 minutes, and that the cathode active material particle 10*a* having a coating layer was prepared in the same manner as in Example 1.

Example 12

A lithium secondary battery was manufactured in the same manner as in Example 1, except that 0.2 g of 10% lithium methoxide methanol solution and zirconium (IV) propoxide were mixed in an isopropanol solution for 30 minutes, and that the cathode active material particle 10*a* having a coating layer was prepared in the same manner as in Example 1.

Example 13

A lithium secondary battery was manufactured in the same manner as in Example 1, except that 0.2 g of 10% lithium methoxide methanol solution and niobium (V) propoxide were mixed in an isopropanol solution for 30 minutes, and that the cathode active material particle 10*a* having a coating layer was prepared in the same manner as in Example 1.

Example 14

A lithium secondary battery was manufactured in the same manner as in Example 1, except that manganese sulfate heptahydrate was used instead of aluminum nitrate, a mixing ratio of nickel sulfate hexahydrate, cobalt sulfate pentahydrate, and manganese sulfate heptahydrate were set so that a mole ratio of Ni, Co, and Mn is 80:10:10, and that the cathode active material particle 11 was prepared in the same manner as in Example 1, and the cathode active material particle 11 was classified to have an average particle diameter of 9.0 μm.

Example 15

A lithium secondary battery was manufactured in the same manner as in Example 1, except that manganese sulfate heptahydrate was used instead of aluminum nitrate, a mixing ratio of nickel sulfate hexahydrate, cobalt sulfate pentahydrate, and manganese sulfate heptahydrate were set so that a mole ratio of Ni, Co, and Mn is 50:20:30, and that the cathode active material particle 11 was prepared in the same manner as in Example 1, and the cathode active material particle 11 was classified to have an average particle diameter of 8.0 μm.

Example 16

A lithium secondary battery was manufactured in the same manner as in Example 1, except that manganese sulfate heptahydrate was used instead of aluminum nitrate, a mixing ratio of nickel sulfate hexahydrate, cobalt sulfate pentahydrate, and manganese sulfate heptahydrate were set so that a mole ratio of Ni, Co, and Mn is 1/3:1/3:1/3, and that the cathode active material particle 11 was prepared in the same manner as in Example 1, and the cathode active material particle 11 was classified to have an average particle diameter of 9.0 μm.

Example 17

A lithium secondary battery was manufactured in the same manner as in Example 1, except that sulfate hexahydrate and manganese sulfate heptahydrate were used instead of nickel sulfate hexahydrate, cobalt sulfate pentahydrate, and manganese sulfate heptahydrate were set so that a mole ratio of Ni and Mn is 5:15, the cathode active material particle 11 was prepared in the same manner as in Example 1, and that the cathode active material particle 11 was classified to have an average particle diameter of 4.0 μm.

Example 18

A lithium secondary battery was manufactured in the same manner as in Example 1, except that the lithium methoxide methanol solution was not used, and that the cathode active material particle 10*a* having a coating layer was prepared in the same manner as in Example 1. Here, lithium was not included in the cathode active material particle 10*a* having a coating layer.

Comparative Example 1

A lithium secondary battery was manufactured in the same manner as in Example 1, except that the cathode active material particle 11-1 was not coated with the coating layer 12.

Comparative Example 2

A lithium secondary battery was manufactured in the same manner as in Example 1, except that the cathode active material particle 11-1 was classified to prepare the cathode active material particle 11 having an average particle diameter of 1.0 μm.

Comparative Example 3

A lithium secondary battery was manufactured in the same manner as in Example 1, except that the cathode active material particle 11-1 was classified to prepare the cathode active material particle 11 having an average particle diameter of 15.0 μm.

Comparative Example 4

A lithium secondary battery was manufactured in the same manner as in Example 1, except that a coating amount of the coating layer 12 was 0.05 mol %.

Comparative Example 5

A lithium secondary battery was manufactured in the same manner as in Example 1, except that a coating amount of the coating layer 12 was 15.0 mol %.

Comparative Example 6

A lithium secondary battery was manufactured in the same manner as in Example 1, except that a calcine temperature of the precursor of the coating layer 12 was maintained at 550° C. Here, as the result of performing powder X-ray diffraction measurement on the cathode active material particle 10a having a coating layer, peaks derived from a lanthanum oxide were confirmed. Thus, the coating layer 12 was confirmed that it was crystalline.

The lithium secondary batteries prepared in Examples 1 to 18 and Comparative Examples 1 to 6 are shown in Table 1.

TABLE 1

| | Cathode active material | | | | | |
|---|---|---|---|---|---|---|
| | | Average particle diameter (μm) | | Coating Compound | | |
| Example | Composition | | Li | Element | Crystalline status | Coating amount (mol %) |
| Ex 1 | $LiNi_{0.8}Co_{0.15}Al_{0.05}O_2$ | 7.0 | Incl. | Lanthanum | Amorphous | 1.0 |
| Ex 2 | $LiNi_{0.8}Co_{0.15}Al_{0.05}O_2$ | 7.0 | Incl. | Lanthanum | Amorphous | 0.1 |
| Ex 3 | $LiNi_{0.8}Co_{0.15}Al_{0.05}O_2$ | 7.0 | Incl. | Lanthanum | Amorphous | 10.0 |
| Ex 4 | $LiNi_{0.8}Co_{0.15}Al_{0.05}O_2$ | 3.0 | Incl. | Lanthanum | Amorphous | 1.0 |
| Ex 5 | $LiNi_{0.8}Co_{0.15}Al_{0.05}O_2$ | 10.0 | Incl. | Lanthanum | Amorphous | 1.0 |
| Ex 6 | $LiNi_{0.8}Co_{0.15}Al_{0.05}O_2$ | 7.0 | Incl. | Yttrium | Amorphous | 1.0 |
| Ex 7 | $LiNi_{0.8}Co_{0.15}Al_{0.05}O_2$ | 7.0 | Incl. | Cerium | Amorphous | 1.0 |
| Ex 8 | $LiNi_{0.8}Co_{0.15}Al_{0.05}O_2$ | 7.0 | Incl. | Aluminum | Amorphous | 1.0 |
| Ex 9 | $LiNi_{0.8}Co_{0.15}Al_{0.05}O_2$ | 7.0 | Incl. | Gallium | Amorphous | 1.0 |
| Ex 10 | $LiNi_{0.8}Co_{0.15}Al_{0.05}O_2$ | 7.0 | Incl. | Indium | Amorphous | 1.0 |
| Ex 11 | $LiNi_{0.8}Co_{0.15}Al_{0.05}O_2$ | 7.0 | Incl. | Titanium | Amorphous | 1.0 |
| Ex 12 | $LiNi_{0.8}Co_{0.15}Al_{0.05}O_2$ | 7.0 | Incl. | Zirconium | Amorphous | 1.0 |
| Ex 13 | $LiNi_{0.8}Co_{0.15}Al_{0.05}O_2$ | 7.0 | Incl. | Niobium | Amorphous | 1.0 |
| Ex 14 | $LiNi_{0.8}Co_{0.1}Mn_{0.1}O_2$ | 9.0 | Incl. | Lanthanum | Amorphous | 1.0 |
| Ex 15 | $LiNi_{0.5}Co_{0.2}Mn_{0.3}O_2$ | 8.0 | Incl. | Lanthanum | Amorphous | 1.0 |
| Ex 16 | $LiNi_{1/3}Co_{1/3}Mn_{1/3}O_2$ | 9.0 | Incl. | Lanthanum | Amorphous | 1.0 |
| Ex 17 | $LiNi_{0.5}Mn_{1.5}O_4$ | 4.0 | Incl. | Lanthanum | Amorphous | 1.0 |
| Ex 18 | $LiNi_{0.8}Co_{0.15}Al_{0.05}O_2$ | 7.0 | Not incl. | Lanthanum | Amorphous | 1.0 |
| CEx 1 | $LiNi_{0.8}Co_{0.15}Al_{0.05}O_2$ | 7.0 | — | — | — | — |
| CEx 2 | $LiNi_{0.8}Co_{0.15}Al_{0.05}O_2$ | 1.0 | Incl. | Lanthanum | Amorphous | 1.0 |
| CEx 3 | $LiNi_{0.8}Co_{0.15}Al_{0.05}O_2$ | 15.0 | Incl. | Lanthanum | Amorphous | 1.0 |
| CEx 4 | $LiNi_{0.8}Co_{0.15}Al_{0.05}O_2$ | 7.0 | Incl. | Lanthanum | Amorphous | 0.05 |
| CEx 5 | $LiNi_{0.8}Co_{0.15}Al_{0.05}O_2$ | 7.0 | Incl. | Lanthanum | Amorphous | 15.0 |
| CEx 6 | $LiNi_{0.8}Co_{0.15}Al_{0.05}O_2$ | 7.0 | Incl. | Lanthanum | Crystalline | 1.0 |

In Table 1, "Ex" refers to Example, and "CEx" refers to Comparative Example.

Evaluation Example 1

Cycle Lifespan Characteristics

The lithium secondary batteries prepared in Examples 1 to 16, Example 18, and Comparative Examples 1 to 6 were charged with a constant current of 0.05 C until an upper limit voltage of 4.2 V at a temperature of 25° C., and the batteries were discharged with a constant current of 0.05 C until a final discharge voltage of 2.5 V at a temperature of 25° C., and the cycle of charging and discharging the batteries was repeated 50 times. However, an upper limit voltage of the lithium secondary battery prepared in Example 17 during the charging was 4.95 V. Here, a ratio of a ratio of a discharge capacity of the $50^{th}$ cycle to a discharge capacity of the first cycle was a discharge capacity retention rate, and the discharge capacity retention rate and the cycle lifespan characteristics of the lithium secondary batteries are shown in Table 2.

TABLE 2

| | Initial capacity (based on Example 1 as 100) | Discharge capacity retention rate after $50^{th}$ cycle (%) |
|---|---|---|
| Example 1 | 100 | 92% |
| Example 2 | 95 | 85% |
| Example 3 | 87 | 94% |
| Example 4 | 91 | 87% |
| Example 5 | 98 | 92% |
| Example 6 | 101 | 86% |
| Example 7 | 98 | 89% |
| Example 8 | 94 | 85% |

TABLE 2-continued

| | Initial capacity (based on Example 1 as 100) | Discharge capacity retention rate after $50^{th}$ cycle (%) |
|---|---|---|
| Example 9 | 101 | 88% |
| Example 10 | 89 | 91% |
| Example 11 | 98 | 89% |
| Example 12 | 99 | 93% |
| Example 13 | 97 | 91% |
| Example 14 | 95 | 89% |
| Example 15 | 89 | 93% |
| Example 16 | 87 | 92% |
| Example 17 | 83 | 85% |
| Example 18 | 92 | 83% |
| Comparative Example 1 | 55 | 52% |
| Comparative Example 2 | 49 | 82% |

TABLE 2-continued

| | Initial capacity (based on Example 1 as 100) | Discharge capacity retention rate after 50$^{th}$ cycle (%) |
|---|---|---|
| Comparative Example 3 | 63 | 70% |
| Comparative Example 4 | 64 | 70% |
| Comparative Example 5 | 43 | 80% |
| Comparative Example 6 | 68 | 76% |

Referring to Table 2, it may be confirmed that discharge capacities and cycle characteristics of the lithium secondary batteries prepared in Examples 1 to 18 have the cathode active material particle 10a having a coating layer are significantly improved compared to those of the lithium secondary batteries prepared in Comparative Examples 1 to 6 that do not have the cathode active material particle 10a having a coating layer.

As described above, according to the one or more of the above embodiments of the present inventive step, a lithium secondary battery may have improved output, particularly discharge capacity and cycle characteristics by reducing a resistance composition generated on an interface between a cathode active material particle and a solid electrolyte particle and increasing conductivity of lithium ions.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A lithium secondary battery comprising:
a cathode layer;
a sulfide solid electrolyte layer; and
an anode layer,
wherein the solid electrolyte layer is between the cathode layer and the anode layer,
wherein the cathode layer comprises
a cathode active material particle having a coating layer that is on at least a portion of a surface of the cathode active material particle and
a solid electrolyte particle which is in contact with the coating layer,
wherein the cathode active material particle is a secondary particle and comprises an agglomeration of a plurality of cathode active material primary particles, each of which is capable of reversibly intercalating and deinterclating lithium ions, wherein the coating layer covers the agglomeration of the plurality of cathode active material primary particles, and wherein an average particle diameter of the cathode active material secondary particle is in a range of about 3 micrometers to about 10 micrometers,
wherein the coating layer is amorphous and contains at least one element selected from semi-metal elements and metal elements other than nickel, and
wherein a mole ratio of
the at least one element of the coating layer not including lithium, to
all of the semi-metal elements and the metal elements, not including lithium in the cathode active material particle
is in a range of about 0.1 mole percent to about 10 mole percent.

2. The lithium secondary battery of claim 1, wherein the cathode active material particle comprises at least one selected from a cathode active material represented by Formula 1 and a cathode active material represented by Formula 2:

$$Li_xNi_yM_{1-y}O_2 \quad \text{Formula 1}$$

wherein, in Formula 1, M is ement selected from Co, Mn, Al, and Mg, 0.5<x<1.4, and 0.3<y,

$$Li_aNi_bM'_{2-b}O_4 \quad \text{Formula 2}$$

wherein, in Formula 2, M' is at least one element selected from Co and Mn, 0.5<a<1.1, and 0.3<b.

3. The lithium secondary battery of claim 1, wherein the coating layer further comprises lithium.

4. The lithium secondary battery of claim 1, wherein the at least one element of the coating layer is at least one selected from Y, La, Ce, Nd, Sm, Eu, Ti, Zr, V, Nb, Cr, Mn, Fe, Co, Cu, Zn, Al, Si, Ga, Ge, and In.

5. The lithium secondary battery of claim 1, wherein the at least one element of the coating layer is at least one selected from Y, La, Ce, Ti, Zr, or Nb.

6. The lithium secondary battery of claim 5, wherein the at least one semi-metal element or the metal element of the coating layer is La or Zr.

7. The lithium secondary battery of claim 1, wherein the sulfide electrolyte particle is at least one selected from $Li_2S$, $P_2S_5$, $SiS_2$, $GeS_2$, and $B_2S_3$.

8. The lithium secondary battery of claim 1, wherein the sulfide electrolyte particle is a combination of $Li_2S$ and $P_2S_5$.

9. The lithium secondary battery of claim 1, wherein the anode layer comprises an anode active material particle and a solid electrolyte particle that contacts the anode active material particle.

10. The lithium secondary battery of claim 9, wherein the anode active material particle is a material which is alloyable with lithium or a material which is capable of reversibly intercalating and deintercalating lithium ions.

11. The lithium secondary battery of claim 1, wherein the mole ratio of the semi-metal element or the metal element of the coating layer and all of the semi-metal elements or the metal elements, excluding lithium, in the cathode active material particle is in a range of about 0.5 mole percent to about 8 mole percent.

12. The lithium secondary battery of claim 1, wherein the mole ratio of the semi-metal element or the metal element of the coating layer and all of the semi-metal elements or the metal elements, excluding lithium, in the cathode active material particle is in a range of about 1 mole percent to about 6 mole percent.

13. A method of preparing cathode layer of a lithium secondary battery comprising the cathode layer, a sulfide solid electrolyte layer, and an anode layer, wherein the sulfide solid electrolyte layer is between the cathode layer and the anode layer, the method comprising:
providing a cathode active material secondary particle having an average particle diameter in a range of about 3 micrometers to about 10 micrometers;

stirring and heating the cathode active material secondary particle with a precursor compound which comprises at least one element selected from semi-metal elements and metal elements not including nickel to form a loaded cathode active material in which the precursor compound is disposed on a surface of the cathode active material secondary particle;

calcining the loaded cathode active material in an oxidizing atmosphere to form an amorphous coating layer on at least a portion of a surface of the cathode active material secondary particle to form a calcined cathode active material having an amorphous coating layer on at least a portion of a surface of the calcined cathode active material secondary particle, wherein the coating layer contains at least one element selected from semi-metal elements and metal elements other than nickel, and wherein a mole ratio of the at least one element of the coating layer not including lithium, to all of the semi-metal elements and the metal elements not including lithium in the cathode active material particle, is in a range of about 0.1 mole percent to about 10 mole percent; and adding a solid electrolyte particle and a solvent to the calcined cathode active material secondary particle to form a mixture;

coating the mixture on a current collector; and drying the mixture to prepare the cathode layer of the lithium secondary battery.

14. The method of claim 13, wherein, in the providing of the cathode active material secondary particle, the cathode active material secondary particle comprises at least one selected from a cathode active material represented by Formula 1 and a cathode active material represented by Formula 2:

$$Li_xNi_yM_{1-y}O_2 \qquad \text{Formula 1}$$

wherein, in Formula 1, M is at least one element selected from Co, Mn, Al, and Mg, 0.5<x<1.4, and 0.3<y, and $$Li_aNi_bM'_{2-b}O_4 \qquad \text{Formula 2}$$

wherein, in Formula 2, M' is at least one element selected from Co and Mn, 0.5<a<1.1, and 0.3<b.

15. The method of claim 13, wherein the stirring and heating of the cathode active material secondary particle with the precursor compound further comprises adding a lithium precursor compound and at least one solvent selected from an alcohol, ethyl acetoacetate, and water to the cathode active material secondary particle and the precursor compound to form a coating solution.

16. The method of claim 13, wherein, the calcining is performed in an oxygen atmosphere at a temperature of less than 400° C.

17. The method of claim 13, wherein, in the preparing of the cathode layer, the solid electrolyte particle is a sulfide solid electrolyte particle.

18. The method of claim 13, wherein the sulfide solid electrolyte particle is at least one selected from $Li_2S$, $P_2S_5$, $SiS_2$, $GeS_2$, and $B_2S_3$.

19. The method of claim 17, wherein the sulfide solid electrolyte particle is obtained by mixing $Li_2S$ and $P_2S_5$ using a melt quenching method or a mechanical milling method.

* * * * *